UNITED STATES PATENT OFFICE.

ERNST NIENSTÄDT, OF NEW YORK, N. Y., ASSIGNOR TO JESSE H. LIPPINCOTT, OF SAME PLACE, AND HERMAN SCHULZE-BERGE, OF ROCHESTER, PENNSYLVANIA.

ETCHING GLASS.

SPECIFICATION forming part of Letters Patent No. 382,318, dated May 8, 1888.

Application filed January 3, 1888. Serial No. 259,633. (No specimens.)

*To all whom it may concern:*

Be it known that I, ERNST NIENSTÄDT, a citizen of Germany, and a resident of New York, in the county of New York and State of New York, have invented a new and useful Improvement in Methods of Etching Glass, Porcelain, and Similar Materials, of which the following is a specification.

On the 6th day of March, 1883, Letters Patent No. 273,588 of the United States were granted to me for an improvement in the art of etching glass and similar materials, upon which my present invention is an improvement.

To carry out the invention set forth in said Letters Patent I stamped a design of proper form upon glass or like material with composition of a gum—such as rosin, copal, sandarac, and the like—dissolved in a fatty oil in such proportions as to be sticky when laid on. Upon this I spread a dry powder of one of the deliquescent salts of fluoric acid, and then subjected the whole to the action of moist air very slightly warmed; but I found in practice that the length of time required to properly etch a pattern was such that the deliquescent salt took on so much moisture from the air that it would spread a little beyond the edges of the design, and so blur and confuse the work. It is to avoid this difficulty that my present invention has been devised.

In the invention set forth in said patent I used only a dry salt of fluoric acid, in which the acid was fixed by its chemical combination with the alkali. In my present invention I use a deliquescent and acidulated salt of the same acid, preferably the hydrate fluoride of ammonia, in which there is a portion of free fluoric acid. By means of this I am enabled to do very much better work in a much shorter time, as fully hereinafter described.

To carry my invention into effect I first prepare a stamping compound of rosin and fatty oil or other suitable solvent in such proportions as to be sticky when laid on. The rosin may be replaced by gum copal, gum-sandarac, gum-dammar, or any like resinous gum; but I have found rosin preferable to any other glutinous substance. With this, by means of a suitable stamp, stencil, templet, or other suitable device, I stamp the desired design on the surface to be etched. This covers only that portion of the surface which is to be etched with the sticky stamping compound and leaves the rest of the surface bare. Upon this enstamped portion of the surface I now spread a deliquescent acidulated salt of fluoric acid, preferably the hydrate fluoride of ammonia, which while in a powder dry enough to be so laid on contains a portion of free hydrofluoric acid. This acid may be added to the pulverized salt before it is laid on, or the salt may be prepared so as to contain the free acid. When the salt has been sprinkled thickly and evenly upon the enstamped design, as aforesaid, the work is subjected to the action of slightly-warm moist air for about from two to five minutes. The whole surface is then thoroughly cleaned, and it will be found that the pattern so enstamped as aforesaid has been beautifully and sharply etched in the surface. It will also be found that by reason of the combination of free fluoric acid aforesaid the length of time required for etching has been so reduced that the deliquescent salt does not have sufficient time to take on enough moisture from the atmosphere to cause it to either spread or blur the design. Thus I produce a much better result in a much shorter time, and on account of the greater rapidity of performance greatly reduce the price of finished work to the consumer.

What I claim as my invention, and desire to secure by Letters Patent, is—

The improved process of etching glass, porcelain, and similar materials hereinbefore set forth, by stamping a design upon the surface of such material with a sticky compound of rosin and fatty oil, then spreading said enstamped portion of said surface with a pulverized hydrofluorate of ammonia containing a portion of free hydrofluoric acid, and lastly subjecting the work to the action of slightly-warmed moist air, all substantially as and for the purpose set forth.

In testimony that I claim the foregoing as my invention I have signed my name, in presence of two witnesses, this 29th day of December, 1887.

ERNST NIENSTÄDT.

Witnesses:
 B. SINGER,
 C. E. M. DONALD.